Inventor,
Dever Campbell Ashmead

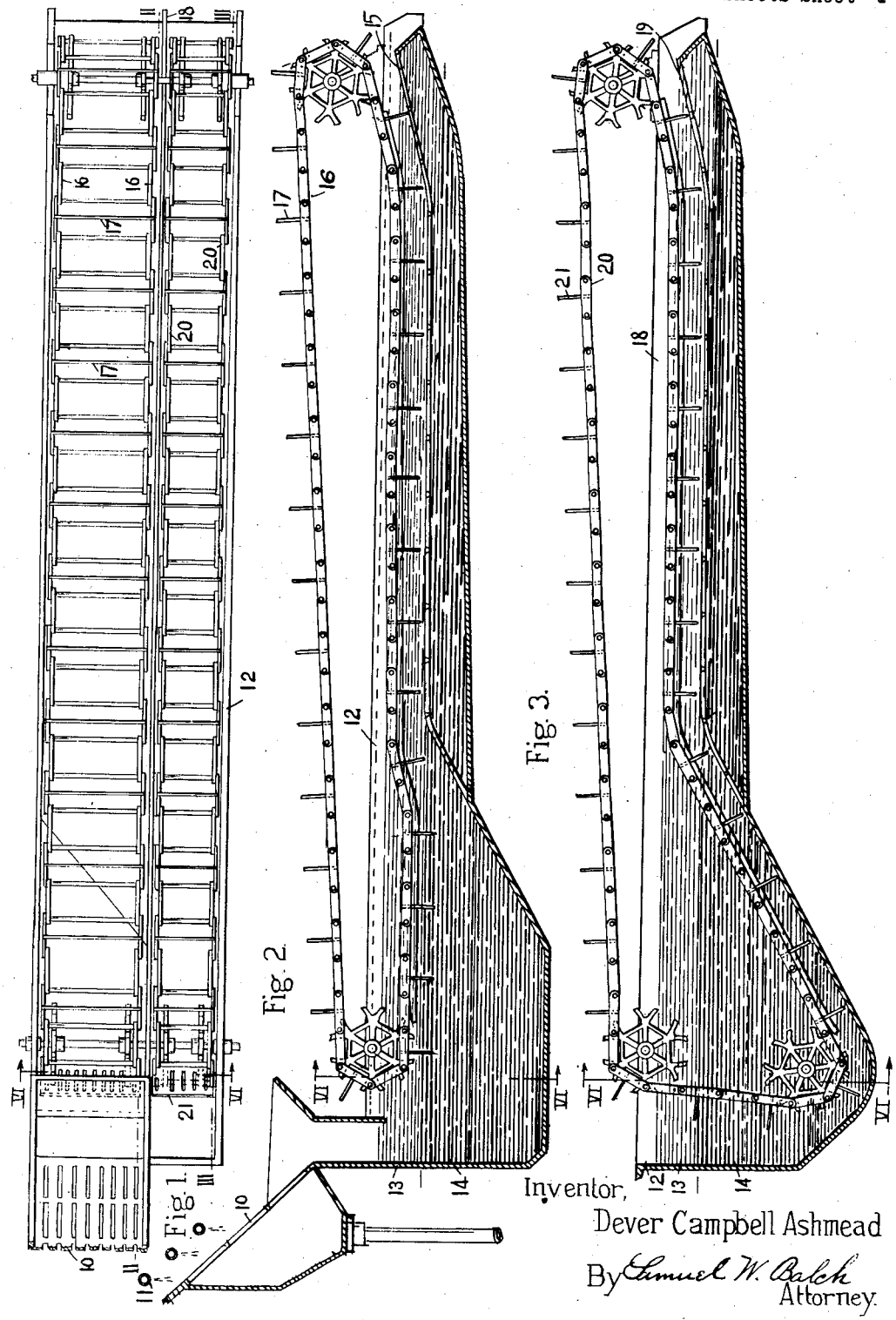

May 16, 1933.　　　　D. C. ASHMEAD　　　　1,909,159
METHOD OF SEPARATION OF GRANULAR MATERIALS
Filed Nov. 28, 1930　　　4 Sheets-Sheet 3

Inventor,
Dever Campbell Ashmead
By Samuel W. Balch
　　Attorney.

May 16, 1933.  D. C. ASHMEAD  1,909,159
METHOD OF SEPARATION OF GRANULAR MATERIALS
Filed Nov. 28, 1930    4 Sheets-Sheet 4

Inventor,
Dever Campbell Ashmead
By Samuel W. Balch
Attorney.

Patented May 16, 1933

1,909,159

UNITED STATES PATENT OFFICE

DEVER CAMPBELL ASHMEAD, OF KINGSTON, PENNSYLVANIA, ASSIGNOR OF ONE-HALF TO GEORGE WASHINGTON WILMOT, OF HAZLETON, PENNSYLVANIA, AND ONE-FOURTH TO EDWARD WELLES, JR., OF WILKES-BARRE, PENNSYLVANIA

METHOD OF SEPARATION OF GRANULAR MATERIALS

Application filed November 28, 1930. Serial No. 498,648.

The object of this invention is to provide for the efficient separation of granular materials having a difference in specific gravity, such as crushed coal and slate, or metal ores and the gangues with which they are associated. Such separation is effected in a settling tank through the medium of a liquid of intermediate specific gravity. Such liquids are expensive, and a further object is to prevent wastage of such liquids in order that the method may be carried out economically on a commercial scale. Also such liquids have volatile components that contaminate the air if permitted to escape, and a further object is to prevent such volatilization.

In the accompanying four sheets of drawings which form a part of this description:

Figure 1 is a top view of a materials separating tank which embodies this invention.

Fig. 2 is a vertical section through the tank on the line II—II of Fig. 1 showing the conveyor for skimming and discharging the floating materials from this tank.

Fig. 3 is a vertical section through the tank on the line III—III of Fig. 1 showing the conveyor for removing and discharging the settled materials from this tank.

Figure 4:
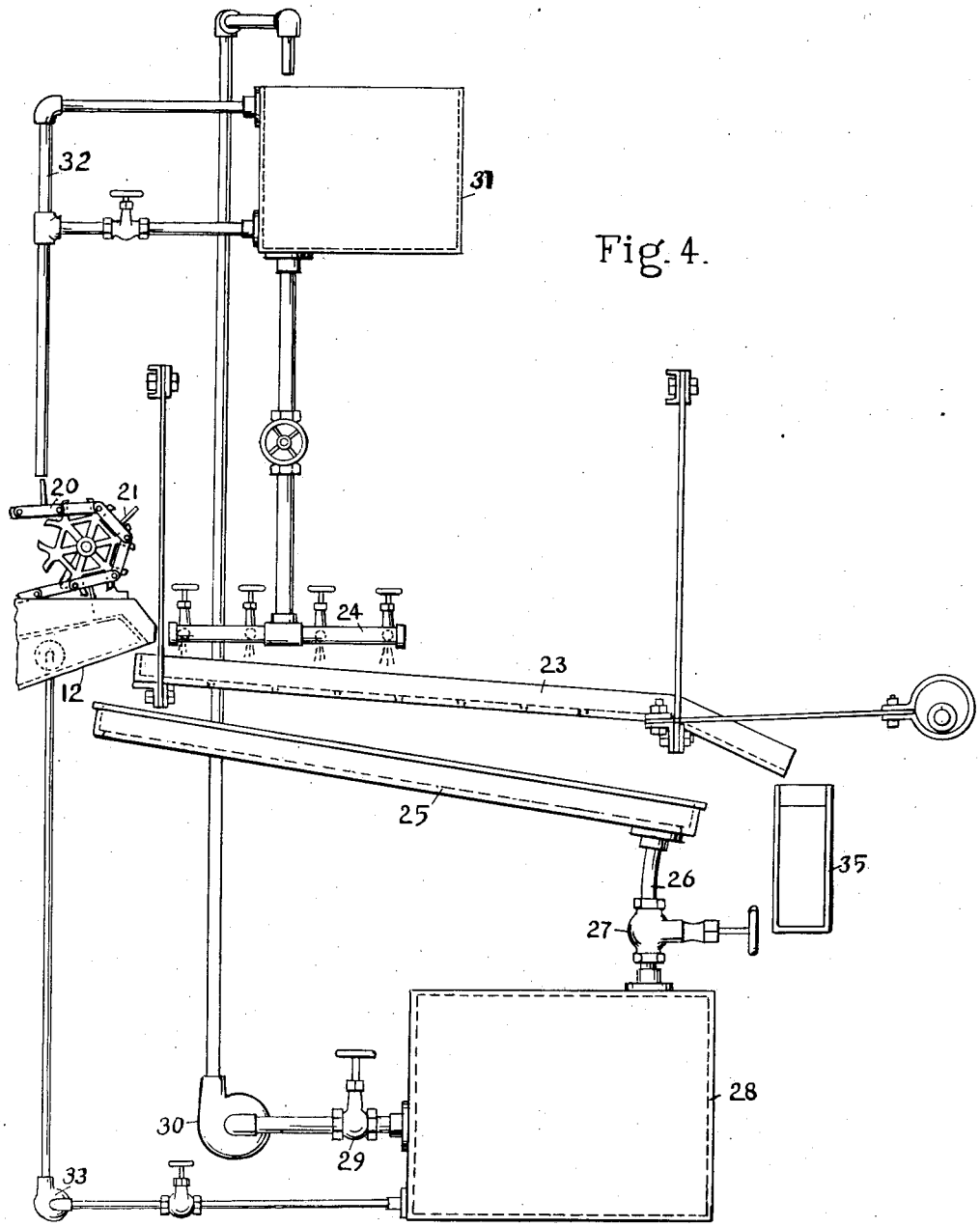
Fig. 4 is a side elevation showing one of the shaking screens, one of the liquor separating tanks, and the circulating system.
Figure 5:
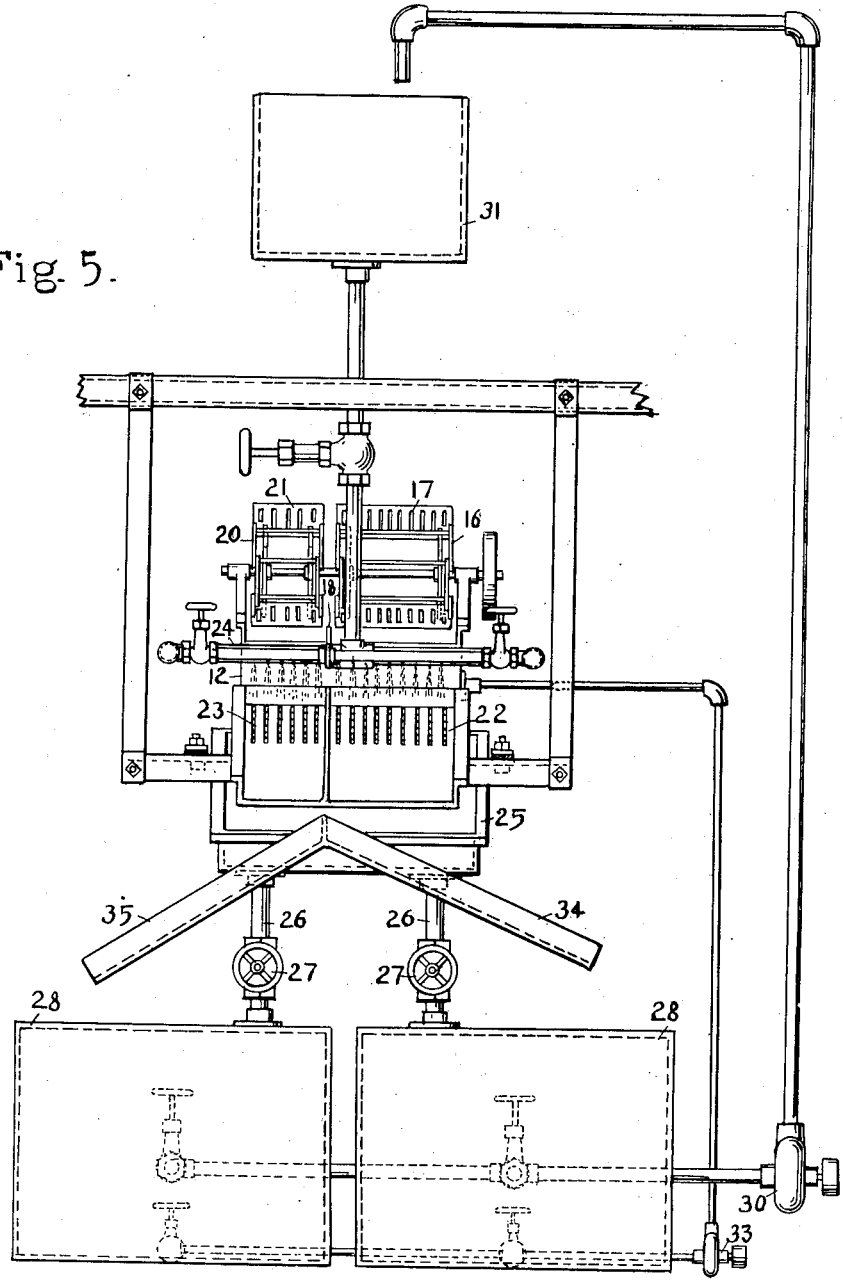
Fig. 5 is an end view of the same showing both screens and tanks.
Figure 6:
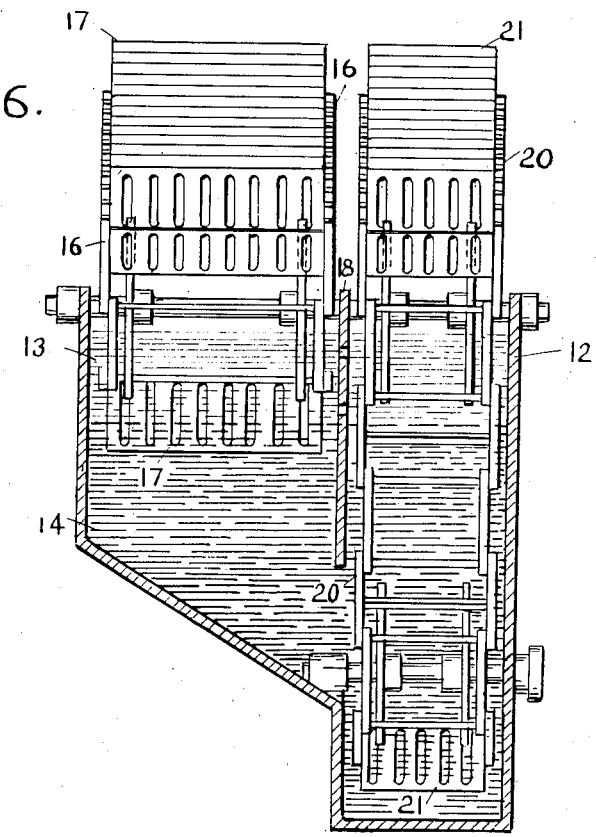
Fig. 6 is a vertical section on the line VI—VI of Figs. 1, 2 and 3, drawn to a larger scale.

As shown, the materials to be separated are first passed down an inclined screen 10 and subjected to a light water spray from a spray pipe 11. By spraying the materials while tumbling down this screen, any adhering grains are broken apart and complete wetting of their surfaces is insured. Any dirt is washed away and grains too small for economical treatment are also removed by the spray water which is discharged since it carries too much dirt for reuse or after use in the other parts of the apparatus. It has been found practical to economically treat material larger than fifty mesh.

From this screen, where the materials have been given a preliminary spraying, they are discharged into the first of two compartments of a materials separating tank 12 through a water seal 13 and into a liquor 14 of which the specific gravity is intermediate of the specific gravities of the materials to be separated. The water seal is conveniently of a depth up to about eighteen inches. The liquor must have the property of not being miscible with water.

The liquid may be chiefly either acetylene tetrabromide, $C_2H_2Br_4$, specific gravity 2.96, acetylene tetrachloride, $C_2H_2Cl_4$, specific gravity 1.64, carbon tetrachloride, $CCl_4$, specific gravity, 1.58, or such mixture as forms a liquor of which a specific gravity is intermediate of the specific gravities of the materials to be separated. For the separation of heavy metal ores from the gangue the liquor is chiefly acetylene tetrabromide, and for the separation of coal and slate the liquid is chiefly acetylene tetrachloride or carbon tetrachloride. A perforated inclined apron 15 extends from a point just below the level of the liquor and out over the top of the tank. The tank extends under the apron. A scraping conveyor with chains 16 and scrapers 17 lead across the tank at or near the level of the liquor and along the apron. To lessen wear the chains are guided so that the scrapers will be held just clear of the apron, and the scrapers are preferably perforated so that the liquor and the water will not be carried along with the material. The conveyor skims the floating materials from the liquor and pushes them along the apron and up through the water seal and discharges them at the end of the tank.

A vertical partition 18 in the tank separates its upper portion into two compartments. It extends from a point below the level of the liquor to the top of the tank. The partition is sufficiently perforated so that no difference in level of either the liquor or the water seal will be set up in the two compartments. The lower portions of the two compartments are in free communication and the bottom of the tank is hopper shaped and converging toward the second compartment which is the deeper.

In the second compartment is a second inclined apron 19 which extends from the bottom of the tank and out over the top. The upper part of this apron is perforated and the tank extends under this apron. A second scraping conveyor with chains 20 and perforated scrapers 21 leads from the bottom of the tank and along the second apron similarly to the other conveyor. It pushes the settled materials up from the bottom of the tank through the water seal and discharges them at the end of the tank separately from the floating materials. The widths of the two compartments and of the conveyors operating in them are preferably proportioned to about the relative quantities of the separated materials.

A shaking screen 22 receives the light portion of the materials and a separate shaking screen 23 receives the heavy portion of the materials discharged from the materials separating tank. A spray pipe 24 overlies the screens and projects a heavy spray of water, preferably with ammonia onto the materials on these screens. The ammonia water washes off and carries with it any liquor which may have been carried over from the materials separating tank, and reduces the traces of liquor which adhere to the materials as they pass off from the shaking screens to such a point that the losses will not render the method uneconomical.

A drip pan 25 underlies the screens and receives the ammonia water together with any of the liquor which has been washed from the separated materials. From the drip pan the ammonia wash water passes through pipes 26 and valves 27 to either or both of two liquor separating tanks 28. The level of the water is maintained in the pipes to minimize the area exposed to evaporation. From near the tops of the liquor separating tanks the ammonia water is drawn off through valves 29 and a circulating pump 30 by which it is lifted to an overhead tank 32 from which it falls to the spray pipes over the shaking screens. Any excess water in the overhead tank drains through an overflow pipe 33 to the water seal in the materials separating tank. A liquor pump 34 is operated as needed to return liquor from the liquor separating tanks to the materials separating tank.

A chute 34 receives and finally discharges from the apparatus the light separated materials from their shaking screen, and a chute 35 receives and finally discharges the heavy separated materials from their shaking screen.

This invention is not limited to the particular apparatus shown for such apparatus may be of any of the customary types which are employed for wet separations depending on differences in the specific gravities of the materials to be separated. The effective specific gravity of the liquor need not be when weighed statically of a value exactly intermediate of the materials to be separated.

I claim:

1. The method of separating granular materials which consists in immersing them under a water seal in a body of liquor of which specific gravity is intermediate of the materials to be separated, skimming the floating separated materials and draining, separately lifting the settled separated materials, discharging them through the water seal and draining, receiving the drippings from the separated materials in a tank with an ammonia water seal, and circulating the ammonia water through a spray onto the separated materials while draining.

2. The method of separating granular materials which consists in subjecting them to a preliminary spraying, immersing them under a water seal in a body of liquor of which specific gravity is intermediate of the materials to be separated, skimming the floating separated materials and draining, separately lifting the settled separated materials, discharging them through the water seal and draining, receiving the drippings from the separated materials in a tank with an ammonia water seal, and circulating the ammonia water through a spray onto the separated materials while draining.

3. The method of separating granular materials which consists in immersing them under a water seal in a body of liquor consisting chiefly of acetylene tetrabromide, skimming the floating separated materials and draining, separately lifting the settled separated materials, discharging them through the water seal and draining, receiving the drippings from the separated materials in a tank with an ammonia water seal, and circulating the ammonia water through a spray onto the separated materials while draining.

4. The method of separating granular materials which consists in immersing them under a water seal in a body of liquor consisting chiefly of acetylene tetrachloride, skimming the floating separated materials and draining, separately lifting the settled separated materials, discharging them through the water seal and draining, receiving the drippings from the separated materials in a tank with an ammonia water seal, and circulating the ammonia water through a spray onto the separated materials while draining.

5. The method of separating granular materials which consists in immersing them under a water seal in a body of liquor consisting chiefly of carbon tetrachloride, skimming the floating separated materials and draining, separately lifting the settled separated materials, discharging them through the water seal and draining, receiving the drippings from the separated materials in a tank with an ammonia water seal, and circulating the ammonia water through a spray onto the separated materials while draining.

6. The method of separating granular materials which consists in immersing them under a water seal in a body of liquor consisting chiefly of acetylene tetrabromide and acetylene tetrachloride, skimming the floating separated materials and draining, separately lifting the settled separated materials, discharging them through the water seal and draining, receiving the drippings from the separated materials in a tank with an ammonia water seal, and circulating the ammonia water through a spray onto the separated materials while draining.

7. The method of separating granular materials which consists in immersing them under a water seal in a body of liquor consisting chiefly of acetylene tetrabromide and carbon tetrachloride, skimming the floating separated materials and draining, separately lifting the settled separated materials, discharging them through the water seal and draining, receiving the drippings from the separated materials in a tank with an ammonia water seal, and circulating the ammonia water through a spray onto the separated materials while draining.

8. The method of separating granular materials which consists in immersing them under a seal of low specific gravity liquid in a body of liquor of high specific gravity, skimming the floating separated materials and draining, separately lifting the settled separated materials, discharging them through the low specific gravity liquid and draining, receiving the drippings from the separated materials in a tank with an ammonia water seal, and circulating the ammonia water through a spray onto the separated materials while draining.

DEVER CAMPBELL ASHMEAD.